Figure 2:
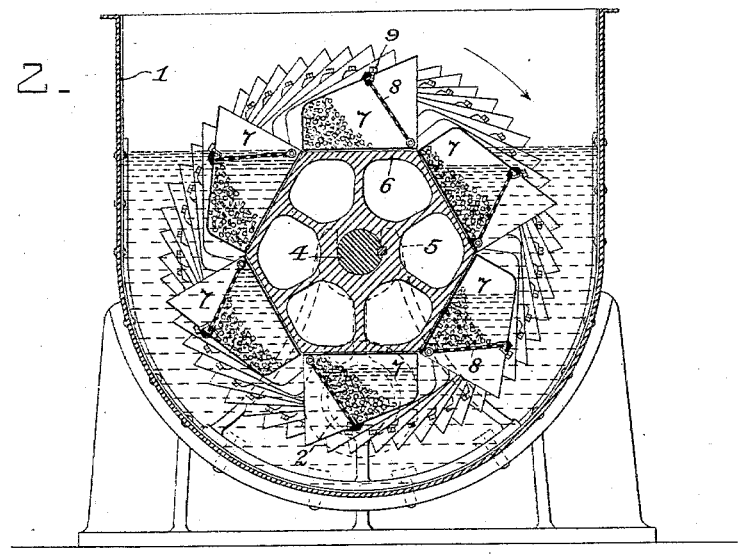

(No Model.) R. T. SCOWDEN, Dec'd. 2 Sheets—Sheet 1.
J. P. Scowden, Executrix.
APPARATUS FOR PURIFYING WATER.
No. 563,811. Patented July 14, 1896.
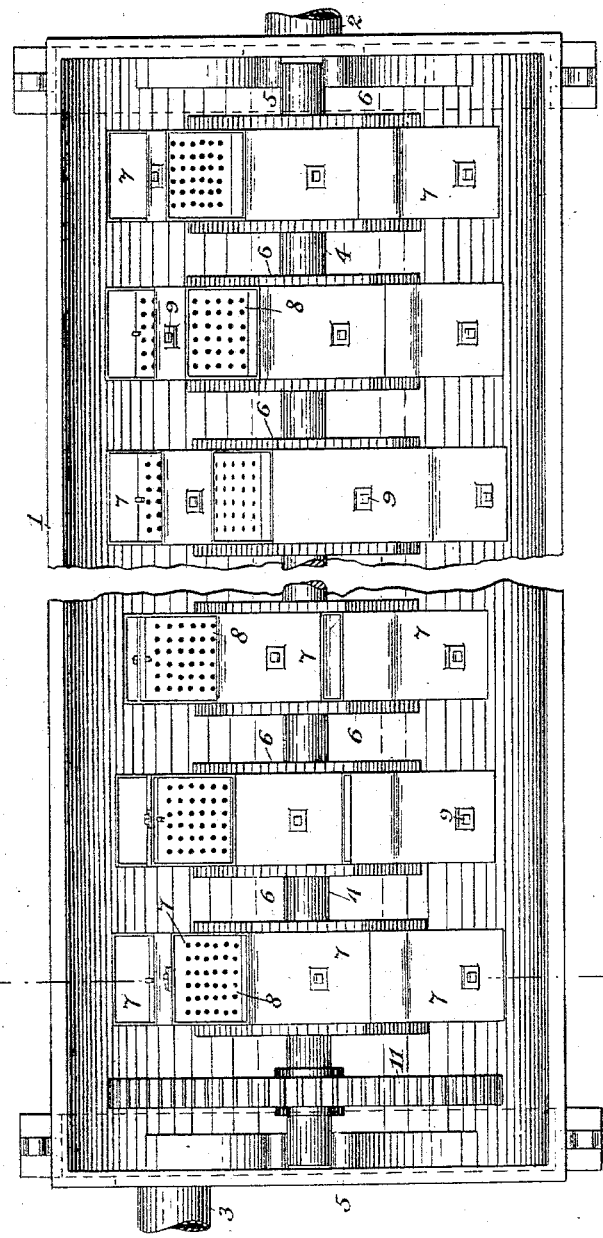
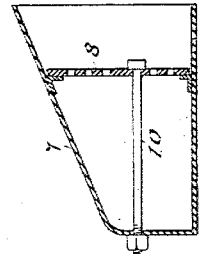
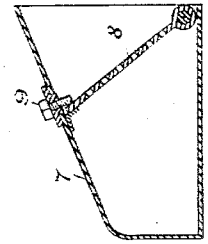
WITNESSES:
E. B. Bolton
H. M. Marble
INVENTOR:
Ransom T. Scowden
By E. M. Marble
his Attorney (No Model.) R. T. SCOWDEN, Dec'd. 2 Sheets—Sheet 2.
J. P. Scowden, Executrix.
APPARATUS FOR PURIFYING WATER.

No. 563,811. Patented July 14, 1896.

WITNESSES:
C. B. Bolton
H. M. Marble

INVENTOR:
Ransom T. Scowden
By E. M. Marble
his Attorney.

UNITED STATES PATENT OFFICE.

RANSOM T. SCOWDEN, OF NEW YORK, N. Y.; JULIA P. SCOWDEN, EXECUTRIX OF SAID RANSOM T. SCOWDEN, DECEASED, ASSIGNOR, BY MESNE ASSIGNMENTS, TO THE REVOLVING PURIFIER COMPANY, OF NEW JERSEY.

APPARATUS FOR PURIFYING WATER.

SPECIFICATION forming part of Letters Patent No. 563,811, dated July 14, 1896.

Application filed August 7, 1893. Serial No. 482,520. (No model.)

*To all whom it may concern:*

Be it known that I, RANSOM T. SCOWDEN, a citizen of the United States, residing at New York, in the county of New York and State of New York, have invented certain new and useful Improvements in Apparatus for Purifying Water, of which the following is a specification.

My invention relates to apparatus for purifying water, and more particularly to apparatus employing what is known as the "Anderson" process, wherein water is purified by coming in contact with scrap-iron, or iron in a finely-subdivided state, such as borings, turnings, punchings, or the like, and is an improvement upon the apparatus covered by Patent No. 513,536, of January 30, 1894.

My invention consists in the novel means provided for aerating water, in the novel receptacles provided for holding the iron by which purification is effected, in the novel means employed for obtaining a very uniform action of the apparatus, and in the novel combination, construction, and arrangement of the parts of the apparatus.

The objects of my invention are, first, to provide more efficient means for aerating the water within the apparatus and oxidizing the ferrous salts contained therein than has been used heretofore; second, to provide means for aerating water which shall require less power than similar apparatus heretofore used, and which shall be more uniform in its action; third, to provide means for securing more uniform distribution of the iron throughout the apparatus, and fourth, to make the apparatus simple, easy of operation and of maintenance, easily charged and cleaned, and as inexpensive as possible. These objects are attained in the apparatus herein described, and illustrated in the drawings which accompany and form a part of this application, in which the same reference-numerals indicate the same or corresponding parts, and in which—

Figure 3:
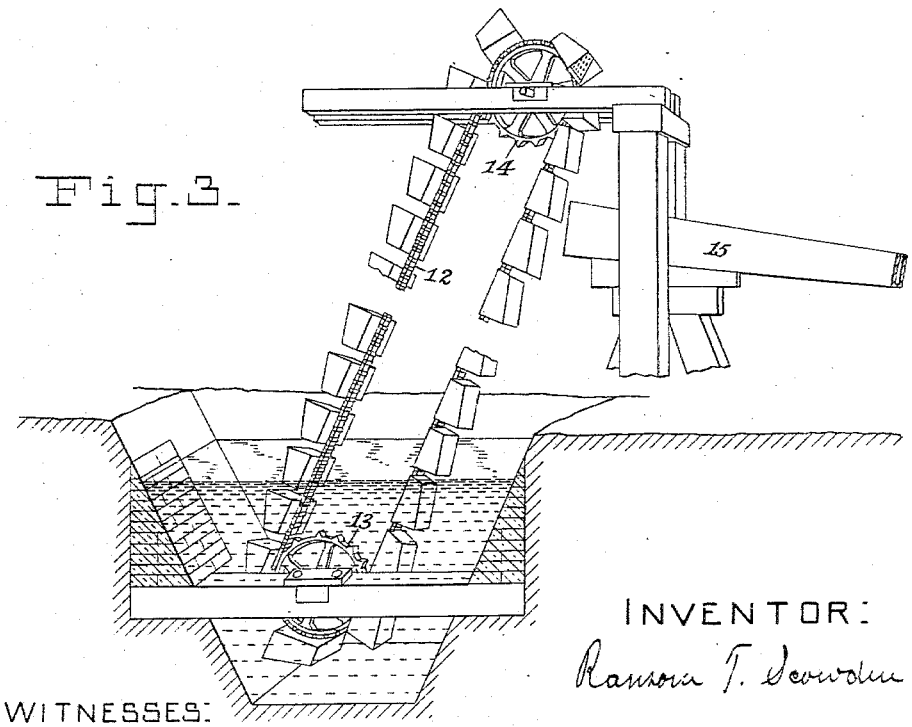

Figure 1 is a plan view of the apparatus employed for carrying out my process. Fig. 2 is a transverse section of the same. Fig. 3 illustrates a modification of the apparatus, which may be used for both purifying and elevating the water of springs and wells. Fig. 4 is a detail sectional view of the bucket used, and Fig. 5 is a similar view of a modified form of bucket.

In the drawings, 1 is a trough or tank which forms the vessel within which the water is treated. At one end, near the bottom, is an induction-pipe 2, and at the other end, near the top, is an eduction-pipe 3. Water enters the tank 1 through pipe 2 and passes out through the pipe 3 to settling-tanks or filters, being acted upon while in the tank 1 by the iron. The settling-tanks are for the removal of the coagulated and precipitated impurities.

Within the tank 1 is a longitudinal shaft, supported in U-bearings 5 5. To this shaft are secured a number of wheels 6 6, carrying buckets 7 7. (Shown in detail in Fig. 4.) These wheels are preferably polygonal, as when so formed the buckets are more readily attached thereto. The buckets are in general similar to the buckets used in any of the ordinary forms of bucket conveyers, and may be constructed of sheet or cast metal, or of other suitable material. They are attached to their wheels 6 in any suitable manner. The mouth of each bucket is closed by a perforated plate 8, which may be held in place by a set-screw 9, as shown in Fig. 4, the plate being hinged to the bucket, or may be held in place by a bolt 10, which runs through to the back of the bucket, as shown in Fig. 5. This plate retains within the bucket the purifying material used, and may be removed to permit of access to the bucket for charging or for any other reason, by unscrewing the set-screw 9 or bolt 10, as the case may be. The perforations in the plate permit of the free passage of air and water into and out of the bucket, and since there is no opening in the back of the bucket, (except in the form shown in Fig. 5, in which the opening through which the bolt 10 passes is sealed by packing or other means, so as to be air-tight,) when the bucket passes down into the water it will carry with it a considerable quantity of air, which is not liberated until the bucket has reached the bottom of the tank 1 and is beginning to rise.

The wheels 6 are so set upon the shaft 4 that the buckets of adjacent wheels are not opposite each other, but are set at slightly-different angular positions, that is, are "staggered." In this manner the action of the apparatus is made very steady and uniform, the water in the tank being constantly and thoroughly agitated and treated with the purifying agent.

To the shaft 4 is attached a gear-wheel 11, which receives its motion from a pinion not shown in the drawings, but which may be conveniently mounted on a shaft hung over the purifier. This gear-wheel 11 is, as shown, inside the tank 1, the tank being so designed and having the bearings 5 so arranged that the ends of the shaft need not project outside of the tank. In this way stuffing-boxes are dispensed with, and the water-level may be carried as high as desired. The bearings in which the shaft rests are not provided with caps, as the slow speed at which the shaft is revolved makes caps to the bearings unnecessary. The absence of the caps to the bearings makes the removal of the shaft, wheels, and buckets a very simple matter, when repairs or renewals make such removal necessary.

Suitable hand-holes may be provided in the bottom of the tank for facilitating the removal of sediment therefrom.

Fig. 3 shows a modification of my purifying apparatus, especially designed for wells or other locations where the water is to be elevated as well as purified. In this case the well itself serves as the tank 1, no other tank or receptacle being necessary. The buckets containing the purifying agent are carried by an endless conveyer-chain 12, which runs over a sprocket-wheel 13 in the bottom of the well, and over another sprocket-wheel 14, situated at a point somewhat above the level to which the water is to be elevated. The buckets may be substantially the same as those shown in the first form of the apparatus. When rising, they are of course full of water, and as they pass over the sprocket-wheel 14 this water is discharged into a trough 15. In this form of my device the endless chain may run at any desired angle from the vertical to, as a limit, the horizontal position, in which case the apparatus would become practically equivalent to that form shown in Figs. 1 and 2, but with the buckets carried on an endless chain running longitudinally through the tank 1 instead of on the wheels 6.

The operation of both forms of apparatus is practically identical, and that of the first or preferred form will alone be described.

Before starting the apparatus in operation, the buckets 7 are charged to about one-third of their capacity with metallic iron in the form of punchings, borings, or chips from turning or planing machines, it being essential that the iron shall be somewhat finely divided, and with the surfaces bright and clean. After the charging is completed, water is admitted to the tank until it rises to the level of the discharge-pipe, and the shaft 4 is caused to revolve slowly. As the buckets which were below the surface of the water rise above the surface and near the top of the wheel the water in these buckets flows out and air rushes in. Since the iron is wet and in comparatively small particles, it is in a very favorable condition for oxidation, and being in thorough and complete contact with the air, the sesquioxid or the corresponding hydroxid of iron is formed. As the buckets descend the agitation of the particles of iron caused by the changing position of the buckets and the attrition between the particles of iron resulting from this agitation causes this freshly-formed oxid or hydroxid to be scraped off and mixes it thoroughly with the water in the bucket, where it remains, suspended in the water, in a very finely-divided state, and therefore in a very favorable condition to unite with any acids, salts, or organic impurities in the water, which it does, forming ferrous salts, and, in all probability, forming ferric salts also to some extent, since the sesquioxid of iron contains so large an amount of oxygen. As the buckets begin to rise the air contained therein escapes, in so doing changing any ferrous salts in the buckets into ferric salts. When the buckets have reached the surface again, the water therein, still charged with ferric oxid or hydroxid, flows out and mixes with the main body of water within the tank, and this free oxid or hydroxid unites with the impurities in the water, forming ferrous and ferric salts as before, the ferrous salts being immediately oxidized into ferric salts by the constant stream of air flowing upward from the buckets.

The water is passed through the tank continuously, and after passing through the tank and being treated in the manner described may be passed into settling-tanks or over filter-beds. The ferric salts, which are insoluble, coagulate, forming a thick flocculent precipitate, which quickly settles, leaving the water clear. In settling, the precipitate carries down with it all earthy impurities held in suspension in the water.

Because of the coarse flocculent nature of the precipitate the clarification of the water by filtration, after being treated as above described, is easily effected, inasmuch as the precipitate does not penetrate into the filter-bed, but remains on the surface, where it can readily be removed. Hence it follows that the filter does not become clogged. In this way the water may be freed from the precipitate very rapidly. If allowed to remain in the settling-tanks for a few hours, however, the precipitate will settle, leaving the water quite as clear and pure as though it had been passed through a filter.

It will of course be understood that the operations which have been described as occurring in regular sequence really occur simultaneously throughout the tank, for while certain buckets are rising other buckets are descending, and the process of oxidation and combination of the oxid or hydroxid with impurities in the water goes on continuously.

The aeration of the water within the tank 1 accomplished by this apparatus is much more thorough than has been accomplished by former apparatus. In such apparatus air has usually been introduced into the tank through a pipe and bubbles upward through the water in the tank, necessarily coming in contact with only a small portion of the water in the tank. Much power is also required to operate the blower used in an apparatus of this kind. In my present apparatus the air is carried downward into the water by the buckets or the iron-containing chambers themselves, being pocketed therein, and is discharged from these buckets as they pass through the water, air passing through practically the whole of the body of water within the tank. Much less power is required for introducing air in this manner than by the blower.

The use of a large number of comparatively small buckets rather than a few continuous longitudinal chambers results in a more thorough distribution of the iron particles in the tanks, there being no liability of the iron to collect at one end of the tank. The operation of the apparatus is more uniform for this reason.

Having thus completely described my invention, what I claim, and desire to secure by Letters Patent, is—

1. In an apparatus for purifying water, the combination, with a tank or receptacle for the water to be purified, of receptacles adapted to contain metallic iron in a finely-divided condition, and means for alternately passing said receptacles through the air and through the water in said tank, said receptacles being substantially air-tight upon the sides which are uppermost when they enter the water and closed on the lower sides, to prevent the escape of the iron, but having in said lower sides perforations through which water and air may pass, whereby free entrance of air and water is afforded but the escape of the iron is prevented and the receptacles are caused to pocket air and carry the same downward into the water, substantially as described.

2. In an apparatus for purifying water, the combination, with a tank or receptacle for the water to be purified, of a shaft revolubly mounted within said tank, and receptacles adapted to contain metallic iron in a finely-divided state, mounted upon said shaft and arranged to be carried alternately through the air and through the water in said tank when the shaft revolves, said receptacles being substantially air-tight upon the sides which are uppermost when they enter the water and closed on the lower sides, to prevent the escape of the iron, but having in said lower sides perforations through which water and air may pass, whereby free entrance of air and water is afforded but the escape of the iron is prevented and the receptacles are caused to pocket air and carry the same downward into the water, substantially as described.

3. In an apparatus for purifying water, the combination, with a tank or receptacle for the water to be purified, of buckets or similar receptacles, adapted to contain metallic iron in a finely-divided state, and to permit of the free passage of air and water in and out thereof, but to prevent the escape of iron therefrom, and means for passing said buckets alternately through the air and through the water in said tank, said buckets being closed at the end which is undermost when they enter the water, to prevent the escape of the iron, but being perforated in said end to permit the free passage of air and water, substantially as described.

4. In an apparatus for purifying water, the combination, with a tank or receptacle for the water to be purified, of buckets or similar receptacles, adapted to contain metallic iron in a finely-divided state, and to permit of the free passage of air and water in and out thereof, but to prevent the escape of iron therefrom, and an endless carrier for said buckets, adapted to carry the buckets alternately through the air and through the water in said tank, said buckets being closed at the end which is undermost when they enter the water, to prevent the escape of the iron, but being perforated in said end to permit the free passage of air and water, substantially as described.

5. In an apparatus for purifying water, the combination, with a tank or receptacle for the water to be purified, of buckets adapted to receive and hold metallic iron in a finely-divided state, and to permit of free entrance and exit of water and air, a shaft 4 revolubly mounted within said tank, and wheels 6 mounted thereon and having said buckets secured thereto, said buckets being closed at the end which is undermost when they enter the water, but being perforated in said end to permit the free passage of air and water, substantially as described.

6. In an apparatus for purifying water, the combination, with a tank or receptacle for the water to be purified, of a shaft revolubly mounted therein, wheels 6 mounted on said shaft, and buckets 7 secured to said wheels, and having plates 8 perforated to permit of the passage of air and water into and out of said buckets, but to prevent the escape of solid substances from said buckets, substantially as described.

RANSOM T. SCOWDEN.

Witnesses:
M. J. CUMMINGS,
FRANK M. JENKINS.